Aug. 26, 1952 N. S. TYLER 2,608,018
ANIMAL TRAP
Filed May 7, 1948
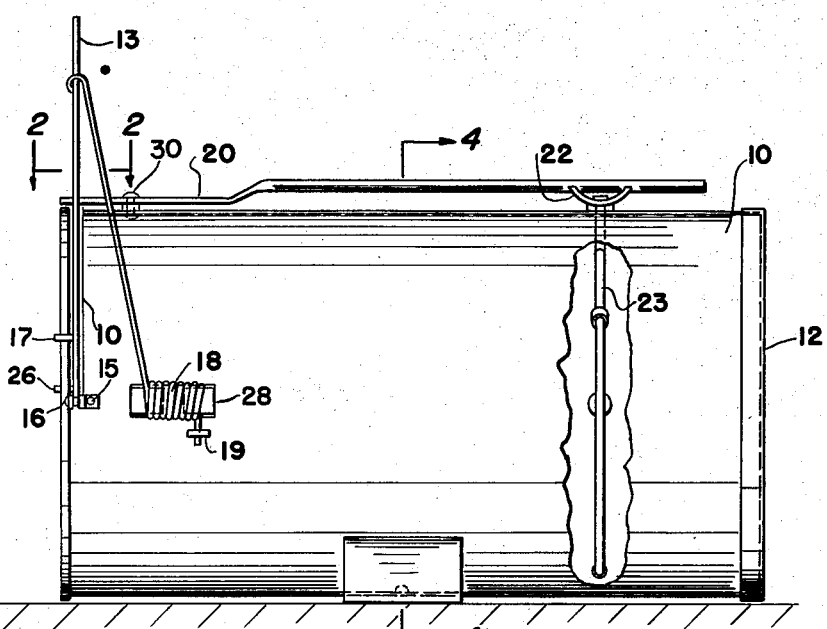
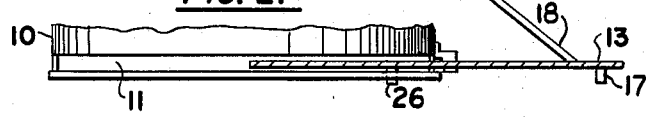
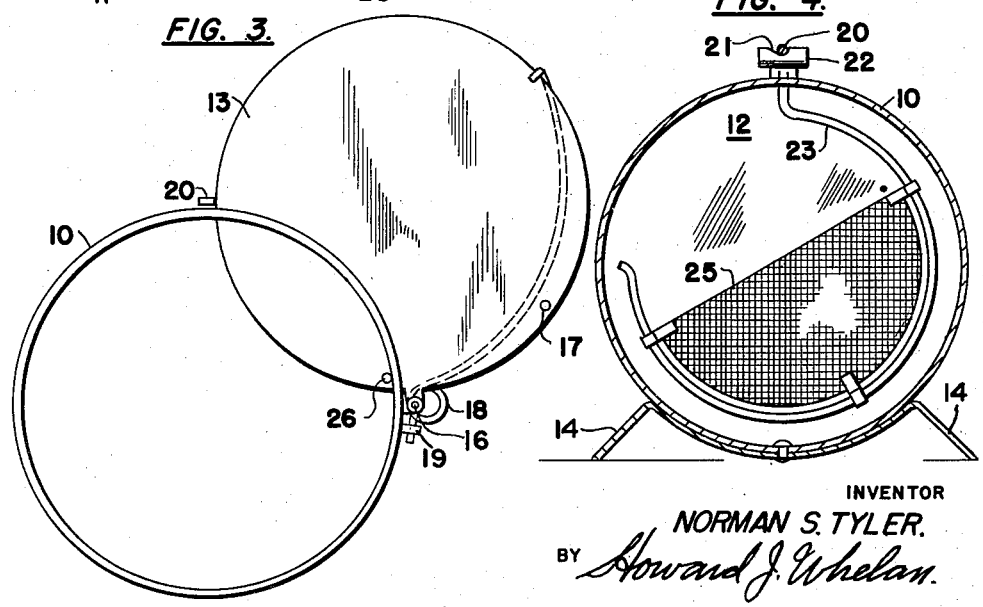
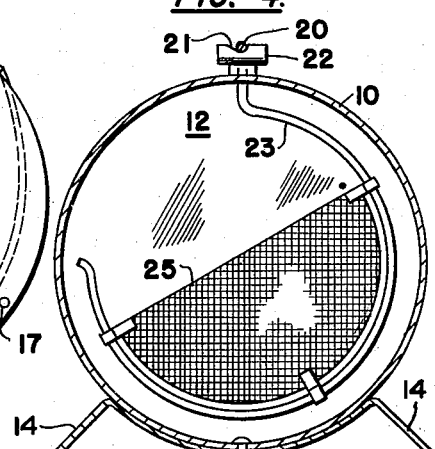
INVENTOR
NORMAN S. TYLER.
BY Howard J. Whelan
ATTORNEY Patented Aug. 26, 1952

2,608,018

UNITED STATES PATENT OFFICE 2,608,018

ANIMAL TRAP

Norman S. Tyler, Baltimore, Md.

Application May 7, 1948, Serial No. 25,550

2 Claims. (Cl. 43—61)

This invention relates to rodent traps and more particularly to those intended for rats and mice found in domestic quarters.

The conventional type of rat-trap utilizes a base with a looped wire hinged thereto and operated by a strong spring when a snap catch is tripped by the rat rubbing up against it. In another form, a wire cage is used with an entrance that closes like a check valve when the rat enters, and prevents the rat from escaping. In the first instance the rat is usually killed by the spring loop when it is released, and tightly clamps the animal to the trap. The removal of the rat is a disagreeable job as it requires the handling of the dead body of the rodent and releasing the heavily tensioned spring, that can easily slip and painfully injure the fingers of the user. In the second case, the rat runs loose within the cage and requires considerable ingenuity to catch it. The cage is cumbersome and conspicuous, which is objectionable.

In this invention the trap consists of a can-like device with a slidable cover, that slips over the can and strikes the rat when it enters and trips the operating mechanism. The rat is thus killed and locked up in the can and cannot get out until removed by the user, in a very convenient manner. The rat is closed in so neatly that it has very little room to move about in.

Should an animal having a shorter body than a rat enter the trap, it will release the cover and close the can to prevent the animal from escaping.

For a clearer understanding of the invention and the principles thereof, reference is made to the attached drawings, and the description following. These together, outline a particular form of the invention by way of example, and indicate how it works. The claims particularly point out the scope of the invention.

In the drawings:

Figure 1 is a side elevation of a trap, embodying this invention with parts broken away to show its inner construction;

Figure 2 is a view looking in the direction of the arrows 2—2 of Figure 1;

Figure 3 is an end view of Figure 2, and

Figure 4 is a sectional view taken along line 4—4 of Figure 1.

Similar reference characters refer to similar parts throughout the drawings.

In the construction, the trap consists of a container 10 preferably of cylindrical form and can-like appearance and it is provided with a long peripheral slot 11 near one end, which is open. The container is supported by a short length of material fixed to the bottom thereof and having depending leg portions 14. The other end is closed by a closure piece 12. The slot 11 is of such a form that it will allow a disc-like cover 13 to slide through it laterally across the open top, with a rotary action. A hole in a lip 15 formed in the container wall has a pin 16 on which the cover 13 is pivoted for this movement. A lug 26 formed on the cover at a selected point adjacent its periphery, prevents the cover from coming out of the container 10 entirely when the cover is in open position. Likewise another lug 17 is provided on the cover 13 to limit the inward travel through the slot, over the container when it moves into closed position. A coil spring 18 is arranged on a support 28 positioned on the outside of the container with one end attached to a punched out member 19 while the other end is fastened to the cover 13 and exerts tension in a direction tending to force the cover 10 through the slot 11, into closed position. However the cover 13 is retained in the open position by a rod 20 pivoted vertically at 30 on top of the container 10 having its lower end set in a groove 21 formed in a plate 22 rotatable at its center with an axle 23 running transversely across the container 10. The rotation of the plate 22 sufficiently disengages the rod 20 from the groove 21 so the upper end of rod 20 will move aside from slot 11 and allow the cover 13 when propelled by the spring 18 to close the can.

The plate 22 has its axle 23 projected into the container 10 and formed with a lateral wing 25 that is located near the closure piece 12. When the wing 25 is pressed on, it rotates the axle 23 which in turn causes the plate 22 attached to it, to rotate and release the rod 20. Ordinarily the wing 25 is actuated by the weight or push forward by the rodent as it enters the container and moves against it with its head or body. The wing in turn trips the mechanism holding the cover 13, the latter pivoting downwardly to close the container. When the rat only partly enters the trap and causes the cover 13 to close, it will be hit by the sharp edge of the cover 13 if its rear end extends out too far. This will kill or make the rat curl up into shorter compass so the cover will complete its closing movement under the action of the spring 18. The removal of the rat or mouse is done by pulling back on the cover so it can be dumped out.

This type of trap does not injure the smaller rodent although it catches it effectively. The striking effect of the cover 13 will kill larger rodents. It may be placed among a number of other cans that it resembles so the rodent will not suspect its purpose, until too late. It is inexpensive to manufacture and easy to handle. It is also comparatively sanitary and light. The setting of the trap is readily performed without danger to the user, as it can be held without the fingers being in the way. Its position ready for catching rats may be vertical, horizontal or angular, without interfering with its effectiveness.

While but one general form of the invention is shown in the drawings and described in the specification, it is not desired to limit this application for patent to this particular form, as it is appreciated that other forms of construction could be made that would use the same principles and come within the scope of the appended claims.

Having thus described the invention, what is claimed is:

1. A rodent trap comprising a container of box-like form open at one end and closed at the opposite end, a cover pivotable over the open end of said container, spring means for tensioning said cover and tending to move the cover to close the open end, means on the outside of the container for holding said cover in open position against the tension of said spring, said means including a rod pivoted between its ends to said container, said rod having one end providing an abutment for contact with said cover, a pivotable rest for the opposite end of said rod normally holding the rod with its abutment against the cover, and means for rotating said rest to release the rod, said last means including a wing-like element within said container connected to said rest and rotatable by a rodent entering the container.

2. A rodent trap as set forth in claim 1 comprising means on the cover for limiting the movement thereof in both its opening and closing operations, said means consisting of a pair of spaced-apart lugs, one of said lugs contacting the inner wall of the container in the open position of the cover and the other lug contacting the outer wall of the container in the closed position of the cover.

NORMAN S. TYLER.

REFERENCES CITED

The following references are of record in the file of this patent:

UNITED STATES PATENTS

| Number | Name | Date |
|---|---|---|
| 26,883 | Buttles | Jan. 24, 1860 |
| 253,907 | Andre | Feb. 21, 1882 |
| 443,975 | Pead | Dec. 30, 1890 |
| 1,028,633 | Swanson | June 4, 1912 |
| 1,326,662 | Kampfe | Dec. 30, 1919 |
| 1,327,229 | Erickson | Jan. 6, 1920 |
| 1,382,416 | Dresser | June 21, 1921 |
| 1,451,720 | Swank | Apr. 17, 1923 |
| 2,229,685 | Swedenburg | Jan. 28, 1941 |